Aug. 7, 1951     L. W. L. EDMONDS ET AL     2,563,225
AIRCRAFT ATTITUDE AND HEADING INSTRUMENT
Filed Nov. 3, 1947     4 Sheets-Sheet 1
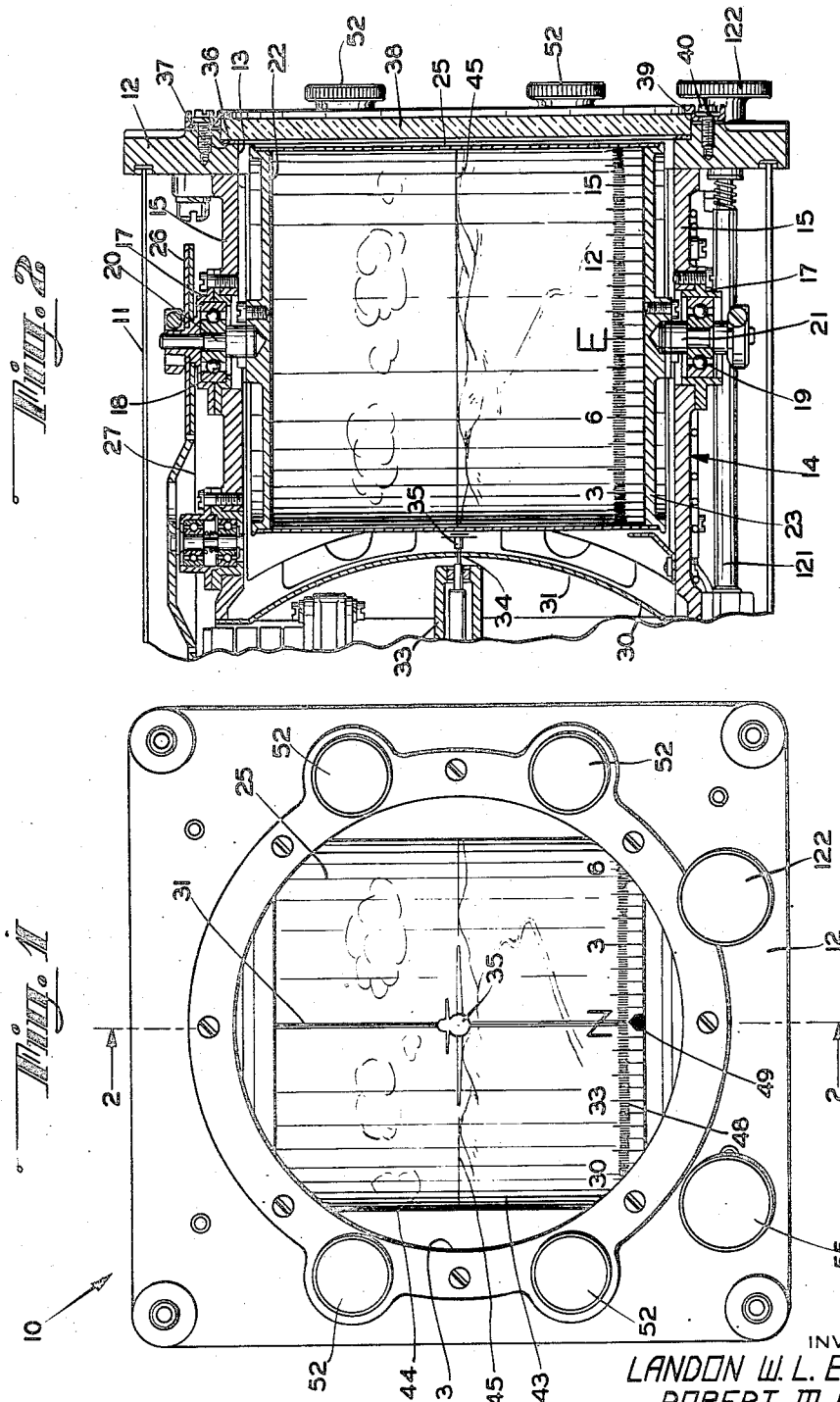
INVENTORS
LANDON W. L. EDMONDS
ROBERT M. BURLEY
BY
ATTORNEY

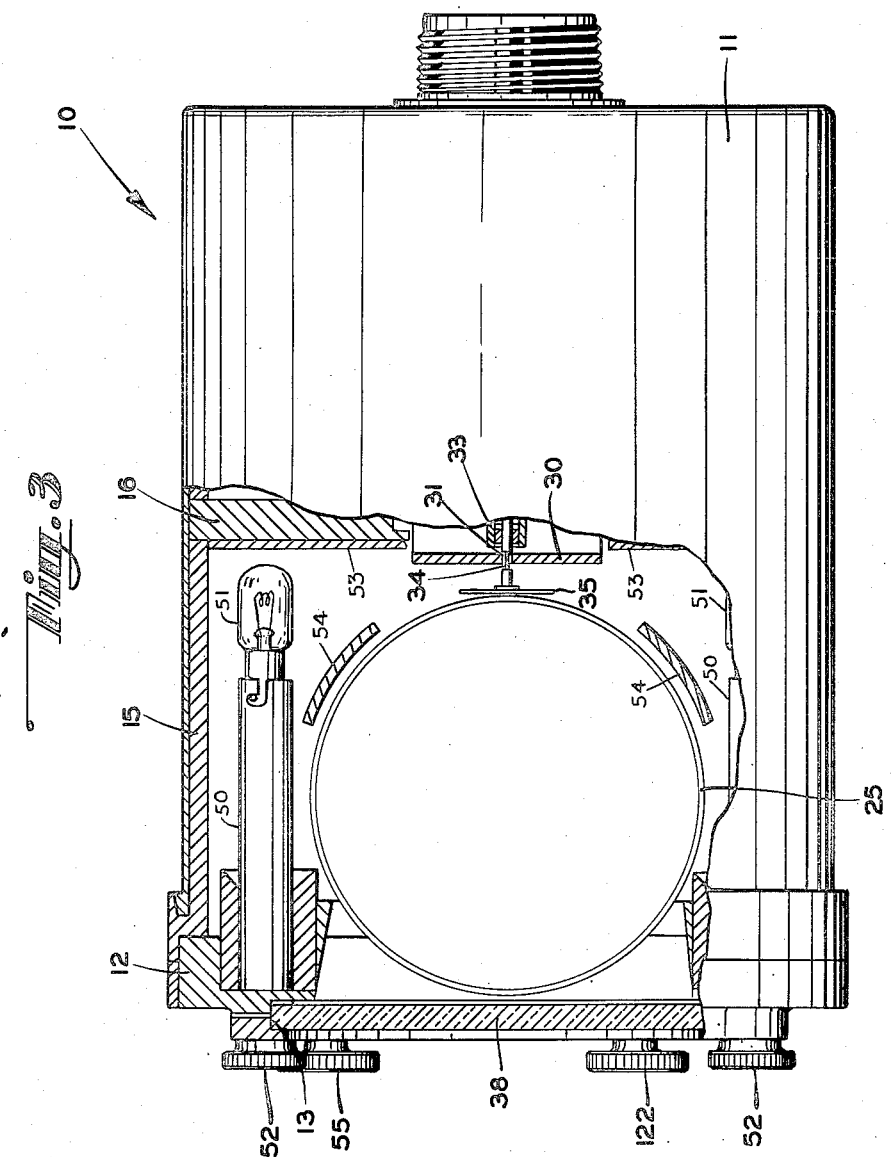

Aug. 7, 1951  L. W. L. EDMONDS ET AL  2,563,225
AIRCRAFT ATTITUDE AND HEADING INSTRUMENT
Filed Nov. 3, 1947  4 Sheets-Sheet 3
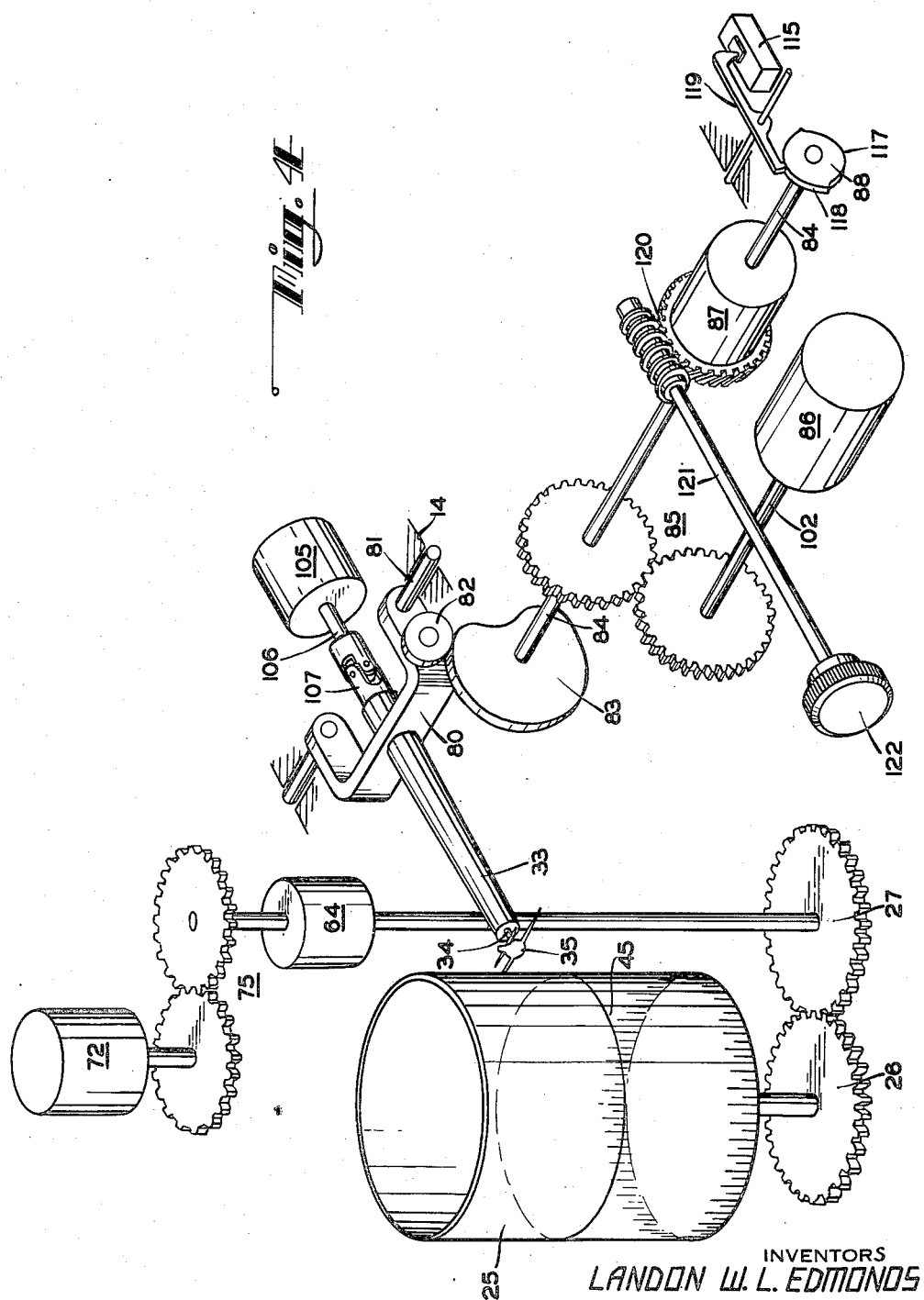
Fig. 4
INVENTORS
LANDON W. L. EDMONDS
ROBERT M. BURLEY
BY 
ATTORNEY

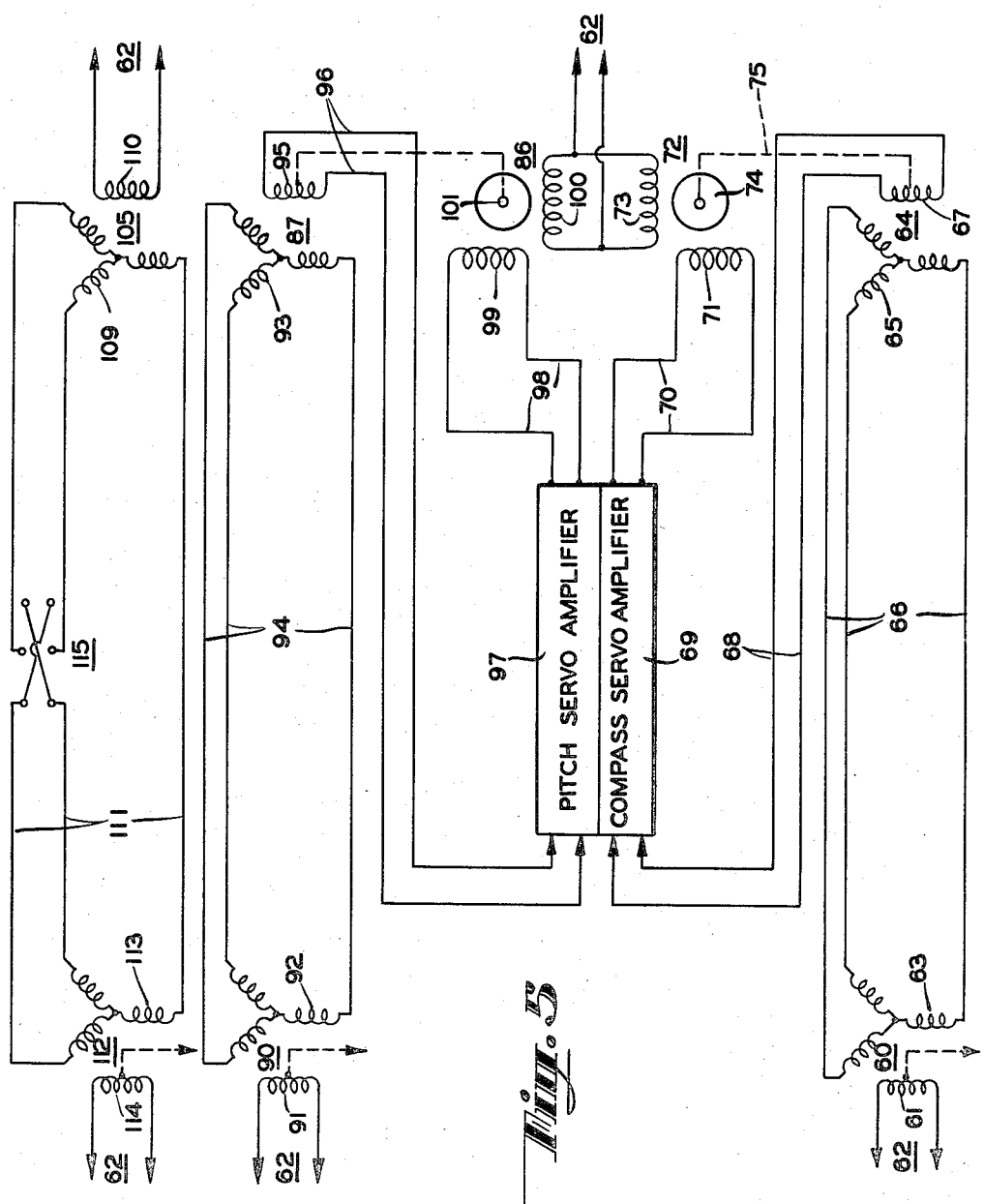

Patented Aug. 7, 1951

2,563,225

UNITED STATES PATENT OFFICE 2,563,225

AIRCRAFT ATTITUDE AND HEADING INSTRUMENT

Landon W. L. Edmonds, Blue Point, N. Y., and Robert M. Burley, La Jolla, Calif., assignors to Bendix Aviation Corporation, Teterboro, N. J., a corporation of Delaware Application November 3, 1947, Serial No. 783,656

15 Claims. (Cl. 33—204)

This invention relates to aircraft instruments, and more particularly to an instrument designed for use in blind flying when the natural horizon is obscured by clouds or fog to enable the pilot to control the attitude and direction of flight of an aircraft.

An object of our present invention is to provide an aircraft instrument for blind flying in which the bank and pitch condition of the aircraft carrying the instrument is indicated by the relative movement of a miniature plane and a panorama of the earth and sky.

Another object of our invention is to provide an aircraft instrument of the character indicated in which compass markings are provided on the panorama for showing aircraft heading with respect to a lubber line.

A further object of this invention is to provide an aircraft instrument of the character described in which the miniature plane of the instrument is rotated over on its back when the pitch angle of the aircraft exceeds 90 degrees.

Still a further object of the present invention is to provide an aircraft instrument of the character described which permits remote installation of a compass and an artificial horizon gyroscope, a telemetering system moving the panorama and miniature plane in response to the indication of said devices.

Yet another object of the invention is to provide in an aircraft instrument of the character described novel means for illuminating the panorama and miniature plane.

Still another object of this invention is to provide a highly improved, compact and rugged aircraft instrument of the character described which shall consist of few, simple and lightweight parts, shall be relatively inexpensive to manufacture, positive in its action and representation, which shall have a large variety of applications, and yet be practical and efficient to a high degree in use.

Other objects of the invention will in part be obvious, and in part hereinafter pointed out.

In the accompanying drawings forming a part of this specification in which one of the various possible illustrative embodiments of the invention is shown, and wherein similar reference characters designate corresponding parts throughout the several views, Fig. 1 is a front elevational view of the aircraft instrument embodying our invention, showing the flight attitude presentation thereof;

Fig. 2 is a cross-sectional view of the instrument taken along the line 2—2 of Fig. 1;

Fig. 3 is a plan view of the instrument with portions broken away to show the lighting arrangement;

Fig. 4 is a schematic perspective view of the synchronous and servo motors, gear trains and cam movements used in moving the panorama and miniature plane; while Fig. 5 is a schematic wiring diagram of the telemetering system operating our instrument.

Referring now to Figs. 1, 2, and 3 of the drawings, the numeral 10 designates an aircraft instrument embodying our invention enclosed in a conventional casing 11. The instrument is supported in the casing by a face plate 12 provided with a suitable aperture 13 forming the face of the instrument, and a frame 14 fixed to said plate having longitudinal members 15 and a transverse member 16 intermediate of the ends.

Fixed to the longitudinal members of the frame 14 in a suitable manner are two bearing retainers 17 having fixed therein two vertically aligned bearings 18 and 19. Rotatably supported in said bearings are two jack-shafts 20 and 21 having fixed to their lower and upper ends, respectively, the circular plates 22 and 23. Fixed to the outer peripheries of said circular plates is a transparent plastic sheet, such as polaroid material, to form a vertical drum 25 visible through the aperture 13 of the face plate. As hereinafter described, the drum is rotated about the vertical axis formed by the shafts 20, 21 through a gear 26 fixed to the shaft 20 and meshing with a gear 27 of a reduction gear train not otherwise illustrated.

Rigidly supported by the transverse member 16 is an elongated arcuate member 30 having therein a vertical slit 31 in the plane formed by the vertical axis of the drum 25. Pivotally mounted on frame 14 (Fig. 4) behind transverse member 16 is a sleeve 33 extending forwardly and capable of being oscillated in a vertical plane. Rotatably supported within said sleeve is a shaft 34 having a reduced portion extending through the slit 31. Integral with the forward end of the shaft is a small plane silhouette 35 visible to an observer through the drum 25.

Fixed in the opening 13 and abutting a resilient gasket 36 on the shoulder 37 of the face plate, is a cover glass 38. The glass 38 is held in place by a retainer 39 and screws 40. For the purposes hereinafter appearing, the cover glass 38 is provided with a light polarizing filter, such as polaroid material and will be referred to as the analyzer plate 38.

The drum 25 has a polarized image incorporated thereon of the earth 43 and the sky 44.

A horizon line 45 divides the earth and sky representations. The scene on the drum is polarized at an angle of 45° to the horizon and is semi-transparent. The scenes 180° apart have the planes of polarization at 90° to each other when viewing the drum along any diameter thereof. The analyzer plate 38 provided for the instrument is fixed thereto so that its plane of polarization is 45° to the horizon and in a plane parallel to the plane of polarization of the scene on the forward part of the drum 25. The plane of polarization of the analyzer plate will be at right angles to the plane of polarization of the scene on the rear portion of the drum as seen through the aperture 13. The observer will thus see through the fore part of the drum which is invisible and observe the new darkened scene of earth and sky on the rear portion of the drum, as well as the gyrations of the miniature plane silhouette 35 with respect thereto.

The drum 25 is further provided along its lower edge with compass markings 48, polarized in the same plane as the scenes described, and visible in the manner hereinbefore described through the analyzer plate 38. The compass markings are read with respect to a stationary lubber line 49 fixed within frame 14 and coinciding with the vertical slit 31 in arcuate member 30.

Means is now provided to adequately light the rear portion of drum 25 and the plane silhouette 35.

To this end there are provided four light fixtures 50 carrying miniature electric light bulbs 51, said fixtures being removable through the face plate 12 by means of the knobs 52. Two vertical plates 53 parallel to the face of the instrument and on either side of the arcuate member 30 are fixed to the frame 14. Two arcuate plates 54 are also provided, fixed to said frame and rearward of the drum 25. The arcuate plates encompass a small portion of the drum, on either side of the member 30. The light bulbs 51 are spaced midway between a pair of plates 53, 54.

The surfaces of the plates 53 and 54 facing each other are provided with a reflective coating preferably of white enamel. The arcuate member 30 is similarly provided with a reflective coating, as well as the interior of the casing 11 adjacent said lights and plates. Thus the light is reflected back and forth across the space separating the two plates being adequatey diffused thereby and providing an evenly illuminated background against which the polarized images may be viewed.

A conventional dimmer switch is provided to vary the illumination of the bulbs 51 actuated by a knob 55 located in the face plate 12.

Means is now provided to rotate the drum 25 in accordance with compass heading.

To this end there is provided a telemetering system (Figs. 4 and 5) comprising a transmitter 60 having a rotor winding 61 connected across a suitable source of A. C. potential 62 and a three phase stator winding 63; and a receiver 64 having a stator winding 65 interconnected to the transmitter by leads 66 and a rotor winding 67. The rotor winding 67 is connected by leads 68 to the input stage of a conventional amplifier and phase discriminator 69, the output of which is connected by leads 70 to the variable phase 71 of a two phase servo motor 72. The fixed phase 73 of the servo is connected to the potential supply 62 while the armature 74 thereof is coupled to the receiver rotor 67 through gears 75 and through the gears 27, 26 to the drum 25.

The rotor 61 of the transmitter 60 is rotated by suitable means (not shown) from a compass or other direction indicating device well known in the art. The voltage induced in the stator windings 63 of the transmitter will appear in the stator windings 65 of the receiver 64. The positional disagreement of the rotors 61 and 67 will cause an error voltage to be induced in the rotor winding 67. The error voltage in winding 67 is impressed on the input of amplifier 69, amplified, and applied to the variable phase 71 of the servo motor 72. Motor 72 will be operated in the proper direction to bring the rotor 67 into agreement with rotor 61, at which point no error voltage will exist. The drum 25 will thus be positioned in agreement with the compass heading upon rotation of the transmitter rotor 61 by the compass.

Means is provided to move the plane silhouette 35 in a vertical plane with respect to the horizon line 45 of the drum 25 to indicate the pitch attitude of the aircraft on which our instrument is mounted.

To this end, the sleeve 33 is fixed in a yoke 80 (Fig. 4) supported by two trunnions 81 in suitable bearing surfaces in the frame 14, parallel with the face of the instrument and in the same plane as the horizon line 45. Fixed to said yoke is a cam follower 82 adapted to ride over the periphery of cam 83 having a non-linear output. The cam 83 is fixed to a shaft 84 driven through gears 85 by a two phase servo motor 86. The servo motor also drives a synchronous receiver motor 87 and a cam 88 through the shaft 84.

Rotation of the cam 83 in a clockwise direction will rotate the yoke 80 in a clockwise direction about the trunnions 81 to move the plane silhouette 35 upwardly with respect to the horizon line 45 of the drum. The silhouette will thus appear to the observer in the sky representation 44 on the drum, indicating a climb attitude of the aircraft. Counterclockwise rotation of the cam will lower the plane silhouette below the horizon line indicating to the observer a dive attitude of the aircraft. It is to be noted that because of the non-linear output of the cam 83, the slight pitch deviations of the aircraft will be magnified so that the plane silhouette is moved with respect to the horizon line 45 comparatively greater distances than for larger deviations in pitch attitude.

To operate the servomotor 86 in accordance with the attitude of the aircraft about its pitch axis a synchronous transmitter 90 (Fig. 5) is provided having a rotor winding 91 connected across the source of potential 62, and a three phase stator winding 92. The rotor winding 91 is adapted to be rotated with respect to its stator winding by suitable take-off and motive means provided for the pitch axis of an artificial horizon gyroscope (not shown), well known in the art. Rotation of rotor winding 91 will induce in the stator winding 92 a signal voltage proportional to the pitch angle of the aircraft. The receiver 87 having its stator winding 93 connected by leads 94 to stator winding 92, will have induced in the rotor winding 95 thereof the signal voltage developed by the transmitter. The voltage in rotor winding 95 will be impressed through leads 96 on the input stage of a conventional amplifier and phase discriminator 97. The amplified voltage will then be impressed through leads 98 on the variable phase 99 of the two phase motor 86, the fixed phase 100 of which is connected across the supply voltage 62. The rotor 101 of the servomotor is mounted on shaft 102 driving the gears 85. The receiver rotor 95 is thus driven in the proper direction into agreement with the transmitter rotor 91 and the plane silhouette 35 positioned with respect to the horizon line 45 in accordance with the pitch attitude of the aircraft.

Means is now provided to rotate the plane silhouette 35 about its own axis to indicate with reference to the horizon line 45 the bank attitude of the aircraft.

To this end a synchronous receiver 105 is provided, fixed within the frame 14 in a suitable manner and having an output shaft 106 extending forwardly thereof in the same plane as the trunnions 81 and at right angles thereto. The output shaft 106 is coupled to the shaft 34 rotatable within the sleeve 33 by a universal coupling 107 in line with the axis of trunnions 81. The operation of the receiver 105 in the manner hereinafter described, will rotate the plane silhouette 35 to indicate the bank attitude of the aircraft. The universal coupling 107 permits both bank and pitch attitude of the aircraft to be indicated at the same time.

Referring now to Fig. 5 of the drawings, the receiver 105 is illustrated as having a three phase stator winding 109 and a rotor winding 110 connected across the potential supply 62. The stator winding 109 is connected by leads 111 to the three phase stator winding 113 of a synchronous transmitter 112. The rotor winding 114 of the transmitter is connected across the source of supply 62, and is adapted to be rotated by a pick-off and motor means of the bank axis of an artificial horizon gyroscope common in the art. The rotation of the rotor 114 will induce a voltage in the stator winding 113 proportional to the bank angle of the aircraft. This bank signal voltage impressed on the receiver stator windings 109 will cause the rotor 110 to rotate into positional agreement with the transmitter rotor. Thus, the rotation of the rotor 110 will angularly displace the plane silhouette 35 with respect to the horizon line 45 to indicate the condition of the bank of the aircraft.

In an instrument of the character already described it is desirable to indicate when the climb or dive angle of the aircraft on which the instrument is mounted exceeds 90 degrees.

To accomplish this end, a reversing switch 115 is connected into two of the leads 111 interconnecting the bank transmitter 112 and the receiver 105. A phase reversal is thus possible to rotate the plane silhouette 180 degrees indicating that the aircraft is flying up-side down. The cam 88 (Fig. 4) rotated by the pitch servo motor 86 through the shaft 84, will actuate the reversing switch 115. The cam 88 is formed with a camming surface 117 approximately 180 degrees in circumferential extent and a second camming surface 118, slightly higher than the surface 117. A pivoted cam follower 119 coacting with the reversing switch 115 will close the switch in either of its positions dependent upon the surface over which the cam follower is riding. Thus, the plane silhouette 35 will be flipped over whenever the dive or climb angle exceeds 90 degrees.

Pitch trim is also provided in the present instrument by the slight rotation of the stator coil 93 through gearing 120 and a shaft 121. A knob 122 on the face of the instrument permits minor adjustments to be made to align the plane silhouette 35 with the horizon line 45.

It will thus be seen that there is provided an aircraft instrument in which the several objects of this invention are achieved and which is well adapted to meet the conditions of practical use.

As various possible embodiments may be made of the above invention, and as various changes might be made in the embodiment above set forth, it will be understood that all matter herein set forth or shown in the accompanying drawings is to be interpreted as illustrative and not in a limiting sense.

Having thus described our invention, we claim as new and desire to secure by Letters Patent:

1. An aircraft instrument having a rotatable drum of transparent material, a simulated horizon separating sky and earth scenes depicted thereon, compass heading markings on said drum, said horizon line, scenes and markings being semi-transparent and polarized in the same plane, an analyzer plate through which the presentations on one side of the drum are observed; an airplane silhouette in juxtaposition to the observed side of said drum, cam means for oscillating said airplane silhouette in a vertical plane with respect to said horizon to indicate the pitch attitude of the aircraft mounting the instrument, motive means for operating said cam means, motive means for rotating said airplane silhouette about its own axis to indicate the bank attitude, motive means for rotating said drum to indicate compass heading; said motive means being operable by the change in attitude and in direction of the aircraft, and means controlled by the cam operating means to affect said silhouette rotating means to rotate said silhouette 180 degrees when the pitch attitude of the aircraft exceeds 90 degrees.

2. An aircraft instrument having a rotatable drum of transparent material, a simulated horizon line separating sky and earth scenes depicted thereon, compass heading markings on said drum, said horizon line, scenes and compass markings being semi-transparent and polarized, and an analyzer plate through which the presentations on one side of said drum are observed: a plane silhouette in juxtaposition to the observed side of the drum, a shaft mounting said airplane silhouette, a yoke rotatably supporting said shaft, cam means for oscillating said yoke to move said airplane silhouette in a vertical plane with respect to the horizon line, and motive means for rotating said shaft independently of said yoke, said cam means and said motive means being operable by the change in attitude of the aircraft mounting the instrument to indicate by the relative position of the airplane silhouette and the horizon line the attitude of the aircraft.

3. An aircraft instrument having a rotatable drum of transparent material, a simulated horizon line separating sky and earth scenes depicted thereon, compass heading marking on said drum, said horizon line, scenes and compass markings being semi-transparent and polarized, and an analyzer plate through which the presentations on one side of said drum are observed: a plane silhouette in juxtaposition to the observed side of the drum, a rotatable shaft mounting said plane, a yoke supporting said shaft, cam means for oscillating said yoke to move said plane silhouette in a vertical plane with respect to the horizon line, motive means for rotating said shaft fixedly mounted in the instrument, and a universal coupling interconnecting said shaft and said motive means, said cam means and said motive means being operable by the change in attitude of the aircraft mounting the instrument to indicate by the relative position of the plane silhouette and the horizon line the attitude of the aircraft.

4. In an aircraft instrument having a vertical drum of transparent material with polarized markings thereon and an analyzer plate for viewing the rear portion of the drum and an opaque member in juxtaposition with the observed portion and to the rear of said drum, illuminating means comprising a light reflective background member for the opaque member, two vertical reflective plates to the rear of the drum on either side of said background member, and parallel to the analyzer plate; two vertical reflective members in juxtaposition with the rear portion of the drum, on either side of the background member, and spaced from said first plates; and a source of illumination between each pair of reflective surfaces composed of a plate and a member to form a lighted background for said drum and the opaque member.

5. In an aircraft instrument having a vertical drum of transparent material with polarized markings thereon and an analyzer plate for viewing the rear portion of the drum and an opaque member in juxtaposition with the observed portion and to the rear of said drum, illuminating means comprising a light reflective background member for the opaque member, two vertical reflective plates to the rear of the drum on either side of said background member, and parallel to the analyzer plate; two arcuate reflective members in juxtaposition with the rear portion of the drum, on either side of the background member, and spaced from said first plates; and a source of illumination between each pair of reflective surfaces composed of a plate and a member to form a lighted background for said drum and the opaque member.

6. In an aircraft instrument having a simulated horizon line and a member simulating an aircraft in flight movable with respect to the horizon line to indicate the attitude of the aircraft mounting the instrument, a shaft mounting the simulating member, means for oscillating said shaft in a vertical plane with respect to the horizon line upon a change in pitch attitude of the aircraft, means for rotating said shaft upon a change in bank attitude of the aircraft, and means controlled by said oscillating means to rotate said shaft 180 degrees when the pitch attitude of the aircraft exceeds 90 degrees.

7. In an aircraft instrument having a simulated horizon line and a member simulating an aircraft in flight movable with respect to the horizon line to indicate aircraft attitude, a shaft mounting said simulating member, a yoke rotatably supporting said shaft, cam means associated with said yoke to oscillate said yoke and shaft in a vertical plane with respect to the horizon line, means for rotating said shaft independently of said yoke and operative upon a change in bank of the aircraft mounting the instrument, and a servo mechanism for operating said cam means operative upon a change in pitch attitude of the aircraft.

8. In an aircraft instrument having a simulated horizon line and a member simulating an aircraft in flight movable with respect to the horizon line to indicate aircraft attitude, a shaft mounting said simulating member, a yoke rotatably supporting said shaft, cam means associated with said yoke to oscillate said yoke and shaft in a vertical plane with respect to the horizon line, motive means for rotating said shaft, a servo mechanism for operating said cam means operative upon a change in pitch attitude of the aircraft mounting the instrument, said motive means being operative upon a change in bank of the aircraft and a switch controlled by said servo mechanism to reverse the operation of said motive means to flip the simulating member on its back when the climb or dive attitude of the aircraft exceeds 90 degrees.

9. In an aircraft instrument having a simulated horizon line and a member simulating an aircraft in flight movable with respect to the horizon line to indicate aircraft attitude, a shaft mounting said simulating member, a yoke rotatably supporting said shaft, cam means associated with said yoke to oscillate said yoke and shaft in a vertical plane with respect to the horizon line, means fixedly mounted in the instrument for rotating said shaft independently of said yoke and operative upon a change in bank of the aircraft mounting the instrument, a universal coupling interconnecting said last means and said shaft, and a servo mechanism for operating said cam means operative upon a change in pitch attitude of the aircraft.

10. An aircraft instrument having a rotatable drum of transparent material, a simulated horizon line separating sky and earth scenes depicted thereon, compass heading markings on said drum, said horizon line, scenes and compass markings being semi-transparent and polarized, and an analyzer plate through which the presentations on one side of said drum are observed: an airplane silhouette in juxtaposition to the observed side of the drum, a shaft mounting said airplane silhouette, a yoke rotatably supporting said shaft, a cam for oscillating said yoke to move said airplane silhouette in a vertical plane with respect to the horizon line, said cam having a non-linear output for moving said silhouette in decreasing increments with respect to the horizon line as the pitch angle increases; and motive means for rotating said shaft independently of said yoke, said cam and said motive means being operable by the change in attitude of the aircraft mounting the instrument to indicate by the relative position of the airplane silhouette and the horizon line the attitude of the aircraft.

11. In an aircraft instrument having a simulated horizon line and a member simulating an aircraft in flight movable with respect to the horizon line to indicate aircraft attitude, a shaft mounting said simulating member, a yoke rotatably supporting said shaft, a cam associated with said yoke to oscillate said yoke and shaft in a vertical plane with respect to the horizon line, said cam having a non-linear output for moving said simulating member in decreasing increments as the pitch angle increases; motive means for rotating said shaft independently of said yoke and operative upon a change in bank of the aircraft mounting the instrument, and a servo mechanism for operating said cam operative upon a change in pitch attitude of the aircraft.

12. In an aircraft instrument having a simulated horizon line and a member simulating an aircraft in flight movable with respect to the horizon line to indicate aircraft attitude, the combination of means for moving said member in a vertical plane with respect to said horizon line upon change in pitch condition of the aircraft, means for tilting said simulating member upon a change in the bank condition of the aircraft, and means operative by said first means to affect said second means when the pitch condition of the aircraft exceeds 90 degrees, to flip the simulating member on its back to indicate inverted flight.

13. In an aircraft instrument having a simulated horizon line, a silhouette to indicate the attitude of the aircraft in which the instrument is mounted, cam means for moving said silhouette transversely of said horizon line to indicate the pitch attitude of the aircraft, motive means for operating said cam means, motive means for rotating said silhouette relative to said horizon line to indicate the bank attitude, said motive means being operable by a change in attitude of the aircraft, and means controlled by the cam operating means to actuate said silhouette rotating means to rotate said silhouette approximately 180 degrees when the pitch attitude of the aircraft exceeds 90 degrees.

14. In an aircraft instrument having a simulated horizon line, a silhouette to indicate the attitude of the aircraft in which the instrument is mounted, a shaft mounting said silhouette, a yoke rotatably supporting said shaft, a horizontal pivot mounting said yoke, cam means for oscillating said yoke about its pivot to move said silhouette in a vertical plane relative to the horizon line, and motive means for rotating said shaft independently of said yoke, said cam means and said motive means being operable by a change in attitude of the aircraft.

15. An aircraft instrument having a casing, a silhouette movable within said casing to indicate the attitude of the aircraft in which it is mounted, a shaft mounting said silhouette, a yoke pivotally mounted in said casing and rotatably supporting said shaft, cam means for oscillating said yoke about its pivot to move said silhouette relative to said casing, motive means for rotating said shaft, rigid with said casing, and a universal coupling interconnecting said shaft and said motive means, said cam means and said motive means being operable by a change in attitude of the aircraft.

LANDON W. L. EDMONDS.
ROBERT M. BURLEY.

REFERENCES CITED

The following references are of record in the file of this patent:

UNITED STATES PATENTS

| Number | Name | Date |
| --- | --- | --- |
| 1,944,619 | Urfer | Jan. 23, 1934 |
| 2,027,808 | Carlson | Jan. 14, 1936 |
| 2,053,183 | Crane et al. | Sept. 1, 1936 |
| 2,283,190 | Crane | May 19, 1942 |
| 2,487,809 | Hoover et al. | Nov. 15, 1949 |